W. H. SAWTELL.
NUT LOCKING DEVICE.
APPLICATION FILED DEC. 26, 1919.
1,347,294.
Patented July 20, 1920.
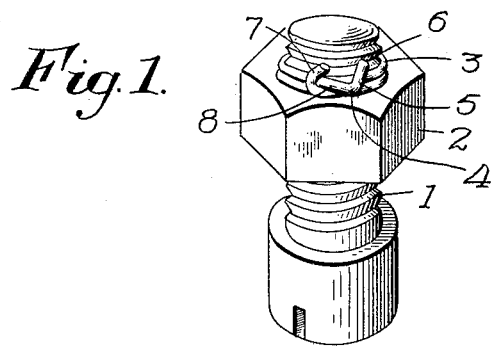
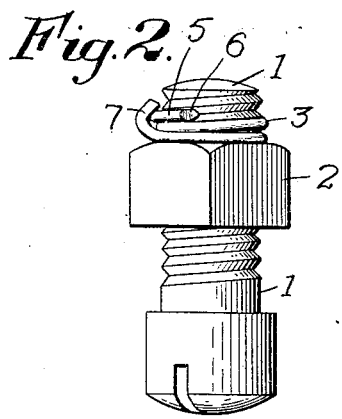
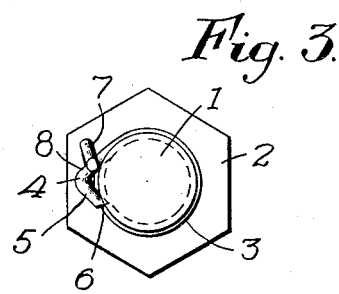
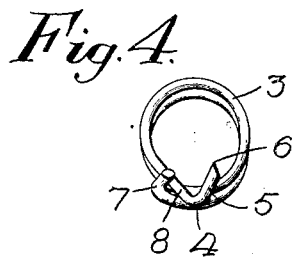
Inventor
William H. Sawtell
By Attorney
George H. Kennedy, Jr.

UNITED STATES PATENT OFFICE.

WILLIAM H. SAWTELL, OF WORCESTER, MASSACHUSETTS, ASSIGNOR OF ONE-HALF TO NAPOLEON R. THIBERT, OF WORCESTER, MASSACHUSETTS.

NUT-LOCKING DEVICE.

1,347,294. Specification of Letters Patent. Patented July 20, 1920.

Application filed December 26, 1919. Serial No. 347,415.

*To all whom it may concern:*

Be it known that I, WILLIAM H. SAWTELL, a citizen of the United States, residing at Worcester, in the county of Worcester and Commonwealth of Massachusetts, have invented a new and useful Improvement in Nut-Locking Devices, of which the following, together with the accompanying drawings, is a specification.

The object of my present invention is to provide a simple and efficient means for locking a nut upon a bolt, whereby the nut is held from displacement due to vibration or jarring of the nut. Various devices have heretofore been used to retain nuts in place when used under conditions of extreme vibration or jarring of the nut, such for example as looms for weaving, automobiles, fish plates of railways, and similar conditions of use. To secure the locking of the nut in position it has been proposed to make radical changes in the construction of the nut itself which requires that a nut of a certain type be employed materially adding to the expense of the nut. Elastic or lock washers have also been extensively used, but such devices are expensive and depend for their efficiency upon the resilience of the washer.

The device embodying my present invention consists of a resilient coil of wire embracing the threads of the bolt outside the nut, said coil having one of its ends bent at substantially a right angle, with its tip entering one of the threads of the bolt, constituting a pawl, and with the opposite end of the wire bent in the form of a hook to embrace the body of the coil and crowd the pawl against the threads of the bolt. When the coil, constructed as described, has been brought firmly against the outer face of the nut any attempt to retract the nut on the bolt will cause the hooked end of the coil to slide over the body of the coil and crowd the pawl firmly against the thread of the bolt, the sliding of the hooked end of the coil over the inclined section of the coil tending to crowd the pawl forcibly against the bolt.

I am aware that it has been proposed to lock nuts in position on the bolt by winding a coil of wire about the threads of the bolt outside the nut, and I do not claim such a device broadly. By my improved construction the retraction of the nut is prevented by crowding the bent end of the resilient coil, acting as a pawl, against one of the threads of the bolt, and to insure against the sliding of the pawl on the surface of the bolt I preferably make the tip of the coil pointed. The hooked end of the coil sliding over the inclined surface of the coil acts as a cam to force the tip of the coil against the bolt.

Referring to the accompanying drawings,

Figure 1 represents in perspective view a bolt and nut with my improved locking device applied thereto.

Fig. 2 is a side elevation of the same.

Fig. 3 is a top view, and

Fig. 4 is a detached view of the locking device.

Similar reference characters refer to similar parts in the different figures.

In the accompanying drawings, 1 denotes a screwthreaded bolt and 2 a nut applied thereto; wound around the threads of the bolt outside the nut 2 is a locking device 3 shown detached in Fig. 4. The locking device 3 consists of a wire coiled to fit the threads of the bolt and capable of being screwed thereon by its rotation. The locking device 3 embodies preferably two complete coils around the threads of the bolt, with the end of the upper coil bent at 4 substantially at right angles, with the end 5, constituting what I term the pawl, having its tip 6 preferably pointed and entering one of the threads of the bolt. The end of the lower coil is curved to form a hook 7 which is bent over the upper coil, that portion of the coil between the bend 4 and the hook 7 forming an inclined cam surface 8. The elbow formed by the bend 4 projects sufficiently from the periphery of the bolt to enable a wrench to be applied against the end 5 and enable the locking device to be secured firmly against the outer surface of the nut 2 when the latter has been brought into its desired position. When the locking device 3 has thus been screwed against the outer surface of the nut any tendency to retract the nut will apply sufficient friction to the lowermost coil to cause the hook 7 to slide over the inclined surface 8 and crowd the tip 6 of the pawl firmly against one of the threads of the bolt. The pressure of the sharpened tip 6 against the thread of the bolt will hold the locking device against any reverse movement which would tend to unscrew it from the bolt, thereby locking the nut in position.

The pressure of the tip 6 of the pawl against the thread of the bolt is produced by the sliding of the hook 7 over the inclined section 8, which is tangential to the curvature of the coil, causing the sliding movement of the hook 7 thereon to crowd the tip 6 of the pawl forcibly against the thread of the bolt, and this sliding movement of the hook 7, over the tangential section 8 will be produced by any rotative movement of the nut, tending to unscrew it from the bolt.

The locking device embodying my invention may be cheaply constructed by coiling a soft or ductile wire which can be readily shaped to form the pawl and hook, and afterward tempering the coil to render it resilient.

I claim,

1. A nut locking device, comprising a resilient spring coil with its convolutions adapted to fit the screw threads of a bolt, with the end of the outer convolution bent at substantially a right angle to engage one of said screw threads, and with the end of the inner convolution hooked over the outer convolution back of its bent section.

2. A nut locking device, comprising a resilient coil of wire adapted to fit the screw threads of a bolt, with the ends of one of its end convolutions bent at substantially right angles and provided with a sharpened tip to enter a screw thread of a bolt forming a pawl, and having the end of the opposite convolution hooked over said bent convolution.

3. The combination with a screw threaded bolt and a nut thereon, of a nut locking device, comprising a resilient coil of wire fitting the screw threads of the bolt, with the outer convolution of the coil bent at substantially right angles, with its end entering one of the screw threads of the bolt, and having a section tangential to the coil, with the end of the inner convolution formed into a hook embracing said tangential section.

4. The combination with a screw threaded bolt and nut thereon, of a nut locking device, comprising a resilient coil of wire fitting the screw threads of the bolt, with the end of the outer convolution projecting tangentially from the coil and bent to contact with one of the screw threads of the bolt, and with the end of the inner convolution hooked over said tangential section.

5. As an article of manufacture, a resilient coil of wire having its outer coil bent to engage the thread of a bolt, with a section substantially tangential to the coil, and having the end of the inner coil hooked over said tangential section.

WILLIAM H. SAWTELL.

Witnesses:
 RUFUS B. FOWLER,
 NELLIE WHALEN.